United States Patent Office 3,104,510
Patented Sept. 24, 1963

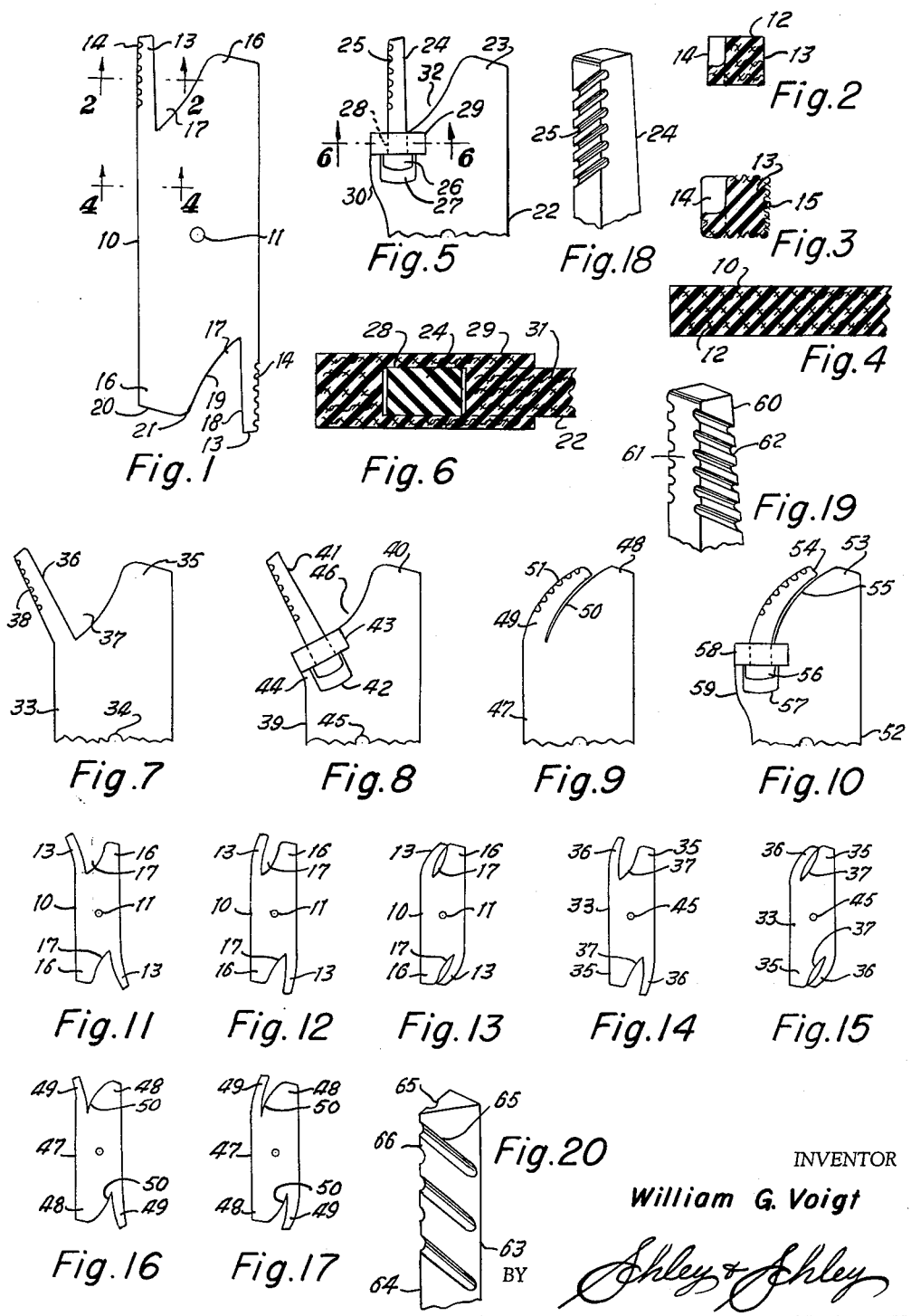

3,104,510
GRASS CUTTING BLADES
William G. Voigt, 120 Placid Drive,
San Antonio 28, Tex.
Filed Aug. 14, 1961, Ser. No. 131,280
14 Claims. (Cl. 56—295)

This invention relates to new and useful improvements in grass cutting blades.

One object of the invention is to provide an improved grass cutting blade of such construction that it may be utilized for mowing, trimming or edging grass in close proximity to fences, curbs, walls and other obstructions.

Another object of the invention is to provide an improved grass cutting blade of tough, flexible material capable of severing grass and/or weeds which surrounds or touches obstacles, such as picket and wire fences, trees, curbs and walls, without damaging the blade and incapable of cutting shoes, electric cords, wire, garden hose or tree roots and of violently throwing rocks and stones.

A particular object of the invention is to provide an improved grass cutting blade having a resilient bumper adjacent to a flexible cutting element or whip for limiting rearward flexing of the element when it strikes an obstruction whereby said element continues to cut grass and/or weeds contiguous the obstruction and tends to grab or pull grass or weeds from the crevices or other openings of said obstruction while undue advancement of the blade is prevented by the resistance of the bumper.

An important object of the invention is to provide an improved grass cutting blade, of the character described, wherein the cutting element has a roughened leading edge which may be in the form of serrations or teeth whereby said element does not require sharpening and will continue to cut until it is substantially worn away.

A further object of the invention is to provide an improved grass cutting blade, of the character described, wherein the entire blade or its cutting element is of relatively inexpensive construction so as to permit economical replacement thereof.

Other objects of the invention are to provide an improved cutting blade, of the character described, having at least a pair of coacting cutting elements and bumpers wherein the entire blade and/or its cutting elements may be reinforced for greater durability; wherein the cutting elements may be made integral with said blade or separately thereof for replacement; wherein said elements may be elastic or of limited flexibility; wherein said elements may be straight or curved; and wherein said elements may extend either radially from the axis of rotation of said blade or somewhat offset from a true radial line.

A construction designed to carry out the invention will be hereinafter described, together with other features of the invention.

The invention will be more readily understood from a reading of the following specification and by reference to the accompanying drawing, wherein examples of the invention are shown, and wherein:

FIG. 1 is a plan view of a grass cutting blade constructed in accordance with the invention, FIG. 2 is an enlarged, cross-sectional view, taken on the line 2—2 of FIG. 1, FIG. 3 is a view, similar to FIG. 2, showing another form of reinforcement, FIG. 4 is an enlarged, cross-sectional view, taken on the line 4—4 of FIG. 1, FIG. 5 is a plan view of one end portion of a modified blade having a removable cutting element or whip, FIG. 6 is an enlarged, cross-sectional view, taken on the line 6—6 of FIG. 5, FIGS. 7–10 are views of one of the end portions of other modified blades, FIGS. 11–13 are plan views of the blade shown in FIG. 1 in free rotating, grass cutting and obstacle bumping positions, respectively, FIGS. 14 and 15 are plan views of the blade of FIG. 7 in grass cutting and obstacle bumping positions, FIGS. 16 and 17 are plan views of the blade shown in FIG. 9 in free rotating and grass cutting positions, respectively, FIG. 18 is an enlarged, perspective view of a portion of one of the whips, and FIGS. 19 and 20 are enlarged, perspective views of portions of modified whips.

In the drawing, the numeral 10 designates the elongate, flat, rectangular body of a grass cutting blade which may be formed of rubber, synthetic rubber, plastics or other suitable flexible and tough material and which has a central mounting opening 11. Although shown as circular, it is pointed out that the opening 11 may be polygonal to prevent rotation of the blade relative to its supporting shaft (not shown). The body 10 may be reinforced in the usual manner by cords, fabric or other suitable flexible material 12 (FIG. 4); however, it is noted that some materials are sufficiently tough and do not require reinforcement. Also, the portion of the body surrounding the mounting opening may be of rigid material. A flexible cutting element or whip 13 extends from each end of the body in substantial alinement with the opposed longitudinal margins thereof whereby the whips are disposed on opposite sides of said body. The whips 13 are elongate, narrow and rectangular, preferably, being tapered so that their outer ends are of reduced width. Each whip may have a roughened cutting or leading edge or surface 14 which may be in the form of small serrations or teeth. When made integral with a reinforced body, the whips 13 contain the reinforcing material 12 (FIG. 2). Instead of being embedded within the whips as well as the body, the reinforcing material may be disposed externally thereof as shown by the numeral 15 in FIG. 3. This is particularly so when the whips are formed separately of the body as shown in FIGS. 5 and 8 and as will be explained.

A resilient end portion or bumper 16 is disposed in spaced relation to each whip 13 for coacting therewith and is formed by a substantially triangular recess or slot 17 provided in each end of the body 10. Each recess 17 has a straight margin or wall 18 extending longitudinally of the body and forming the trailing edge of the adjacent whip. As shown by the numeral 19, the other wall of the recess is concave and extends outwardly from the apex of said recess away from the whip so as to form the leading edge of the bumper 16. The trailing edge of the bumper is alined with and forms a continuation of the longitudinal margin of the body opposite the whip. Each bumper is of much greater width, more than double, and of slightly less length than its coacting whip. Preferably, the outer end edge 20 of the bumper 23 is inclined inwardly toward its trailing edge. Between the leading and end edges 19 and 20, the bumper is bevelled or chamfered as shown by the numeral 21.

One end portion of a modified blade is shown in FIGS. 5 and 6 and includes a body 22 similar to the body 10 and having an identical bumper 23 at each end thereof. In place of each whip 13, a similar cutting element or whip 24 is removably mounted on each end of the body in spaced relation to each bumper 23 and in substantial alinement with the longitudinal margin of said body opposite said bumper. The removable whip 24 has serrations or teeth 25, which may be identical to the teeth 14, on its leading edge or surface and an enlarged head or inner end portion 26. A substantially rectangular recess or slot 27 is formed in the body and is elongated longitudinally thereof for receiving the head 26 of the whip. The outer portion of the slot 27 is reduced in width to provide a socket 28 (FIG. 6) complementary to the whip 24. A boss or collar 29 surrounds the socket 28 for confining the head against outward displacement and is formed by enlarging and increasing the thickness of the body 22 adjacent said socket. As shown by the numeral 30 in FIG. 5, the body 22 bulges laterally outward to accommodate the slot and socket and to dispose the leading edge of the whip in substantial alinement with the longitudinal margin of the body. A recess 32, identical to the recess 17, is provided between each bumper 23 and whip 24 to permit limited flexing of the whip.

The slot 27, exclusive of its socket 28, is of greater length than the head 26 to facilitate installation and removal of the whip 24. Although the whip may be reinforced as shown in FIGS. 2 or 3, the reinforcement may be omitted as shown in FIG. 6. Usually, the body 22 has reinforcing material 31 embedded therein; however, some flexible materials do not require reinforcement and it has been found that the flexibility of the whips may vary between elasticity and relative stiffness. Therefore, the whips may be unreinforced without impairing the durability or cutting action thereof.

As shown in FIG. 18, the teeth 25 may extend diagonally of the whips 24 or at an angle to the longitudinal and transverse axes thereof so that portions of said teeth remain upon wearing off of the ends of said whips. Although the teeth 14 of the whips 13 also may be diagonally disposed, this arrangement is not critical and said teeth as well as the teeth 25 may be parallel to the transverse axes of the whips. Since the teeth or serrations of the leading edges or surfaces are adapted to grab or pull grass or weeds, said edges may be roughened in any suitable manner so long as projections are provided for grasping the grass or weeds. With the exception of the removable whips and their mountings, the blade of FIG. 5 is identical to the blade of FIG. 1 and functions in the same manner. It is pointed out that the teeth or serrations need not be formed in the leading surface of the whips. A modified whip 60 is shown in FIG. 19 and has a smooth leading surface 61 with diagonal teeth or serrations 62, similar to the teeth 14 and 25, formed in its lateral surfaces. Another modified whip 63 is shown in FIG. 20 and is triangular in cross-section so as to have a pointed or sharp leading edge 64. The lateral surfaces of the whip 63 have diagonal grooves or recesses 65 formed therein to provide teeth or serrations 66 on the leading edge 64. Preferably, the grooves 65 of one lateral surface are offset relative to the grooves of the other lateral surface so as to increase the number of and reduce the size of the teeth 66. Manifestly, the teeth 62 and 66 will withstand more wear than the teeth 14 and 25. Although not shown, it is readily apparent that the teeth may extend entirely around the whips to permit reversal thereof. Also, the whips may be circular in cross-section instead of rectangular.

Due to the flexibility of the whips 13, the centrifugal force generated by counter-clockwise rotation of the blade body 10 causes said whips to flex forwardly and assume substantially radial positions (FIG. 11). If sufficiently elastic, the whips elongate or stretch so as to project an appreciable distance past the circle described by the extremity of the bumpers 16. Upon contact with grass or weeds, the whips flex clockwise or rearwardly toward the bumpers and their teeth 14 cut or sever the grass or weeds by a grabbing or pulling action. As shown in FIG. 12, the whips return approximately to their original static positions and the internal binding stress is minimized while cutting. When the whips strike an obstacle, such as a rock, curb, fence, tree or wall, said whips flex into engagement with the bumpers (FIG. 13) and additional clockwise or rearward flexing thereof is prevented. It is noted that the whips, when flexed into engagement with the bumpers, continue to cut the grass or weed which surround or touch the obstacle. The latter clockwise flexing is momentary if the obstacle is a rock or stone, since the blade will either ride over or push aside an obstacle; however, it will not violently throw the obstacle due to its flexibility which reduces the impact. Although sufficiently flexible to undergo limited flexing, the bumpers resist continued advancement of the blade and tend to push said blade away from the obstacle. When the obstacle is large or immovable, the bumpers absorb the shock of collision and maintain the whips in close proximity thereto while preventing undue flexing and possible breaking off of said whips. Since the cutting action of the whips is not dependent on the sharpness of their leading edges, the striking of obstacles merely wears said leading edges without materially reducing the efficiency of said whips. Due to the centrifugal force of rotation, the whips are constantly urged counter-clockwise out of engagement with the bumpers and tend to enter the crevices or other openings of obstructions, such as picket and wire fences, and grab or pull grass or weeds therefrom. The flexibility of the whips and bumpers, however, prevents the cutting of shoes, wire, electric cords, garden hose or tree roots.

One end portion of another modified blade is shown in FIG. 7 and includes a body 33 similar to the body 10 and having a similar mounting opening 34, bumper 35 and cutting element or whip 36. A recess 37, similar to the recess 17, spaces each whip 36 from its coacting bumper 35. The whip 36 is identical in shape to the whip 13 and may have identical teeth 38. Instead of being alined with the adjacent longitudinal margin of the body 33, each whip projects laterally from said body substantially radially of its mounting opening 34 so as to be spaced a greater distance from the bumper 35. The radial whips may be removably mounted as shown in FIG. 8, wherein the body 39 of a modified blade has a bumper 40 and whip 41 substantially identical to the bumper 23 and whip 24 of the blade body 22. An angularly-disposed slot 42, boss 43 and bulge 44, similar to the slot 27, boss 29 and bulge 30, are provided for supporting each whip 41 in substantial radial alinement with the mounting opening 45 of the body 39. Each whip is spaced from its coacting bumper 40 by a recess 46 which is similar to the recess 37. Except for the removable mounting of the whips, the blades of FIGS. 7 and 8 are identical and function in the same manner.

Due to the radial disposition of the whips 36 and 41, the positions of the same are not changed upon counter-clockwise free rotation and are as shown in FIGS. 7 and 8. As shown in FIG. 14, the whips flex clockwise toward the bumpers when cutting grass or weeds and engage said bumpers upon striking an obstruction (FIG. 15). When flexed clockwise, the whips 36 and 41 are under greater tension than the whips 13 and 24 and have a greater counter-clockwise cutting force. Otherwise all of the blades function in the same manner.

In FIG. 9, one end portion of another modified blade is shown and includes a body 47 having an integral bumper 48 and cutting element or whip 49. The latter is curved inwardly from one longitudinal margin toward the opposite longitudinal margin of the body in close proximity to the bumper. A narrow, curved slot or slit 50 separates each bumper from each whip whereby said bumper has a convex leading edge and said whip has a complementary concave trailing edge. Otherwise, the bumpers 48 are substantially identical to the bumpers 16 and 35. Teeth or serrations 51, similar to the teeth 14, 25 and 38, are formed in the convex leading edge of each whip 49. The curved whips may be removably mounted, in the same manner as the whips 24 and 41, on the body 52 of a modified blade (FIG. 10) which is most similar to the blade body 22. A bumper 53 and a removable, curved whip 54, similar to the bumpers 48 and whips 49, are provided on each end of the body 52 and may be spaced apart by a narrow, curved recess 55 which is similar to the slit 50. It is noted that the whips are of less length than the bumpers. Each whip 54 has an enlarged inner end or head 56, similar to the head 26 of the whip 24, and each end of the body has a slot 57, boss 58 and bulge 59 which may be identical to the slot 27, boss 29 and bulge 30 of the body 22. Manifestly, the blades of FIGS. 9 and 10 and their whips 49 and 54 function in the same manner.

The whips 49 flex away from the bumpers 48 upon counter-clockwise rotation of the blade body 47 so as to open the slits 50 as shown in FIG. 16. Upon contact with grass or weeds, the whips flex clockwise toward the bumpers in the same manner as the whips 13 and 36 so as to partially close the slits (FIG. 17). The striking of an obstacle causes the whips 49 to engage the bumpers 48 and close the slits 50 substantially as shown in FIG. 9. Due to their clockwise curvature, the whips 49 and 54 are under tension when flexed counter-clockwise and have a tendency to move away from grass, weeds or obstructions whereby said whips are subject to less abrasive wear. Also, the complementary curvature of the adjacent surfaces of these whips and their coacting bumpers 48 and 53 provides greater stability since said whips are subject to less flexing action and have a more positive backing. With the exception of the foregoing, the blades of FIGS. 9 and 10 operate like the blades of FIGS. 1, 5, 7 and 8.

It is noted that any of the blades may or may not be reinforced and the same applies to their whips. The blades and/or their whips are adapted to be replaced when worn and do not require sharpening. Although of relatively inexpensive construction, the flexibility of the blades and their whips prevents the usual damaging thereof and increases the durability of the same. Depending upon size, the blades may be used for mowing or edging with greater efficiency and less danger than conventional metal blades. The removability of the whips is particularly advantageous when the blades are of the large type used on lawn mowers.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A grass cutting blade including a body, a flexible cutting element extending from the body, and a resilient bumper extending from said body with its leading edge adjacent the trailing edge of the element for engagement by said element to limit rearward flexing thereof when said element strikes an obstruction.

2. A grass cutting blade as set forth in claim 1 wherein the flexible cutting element and resilient bumper are of substantially the same length and the bumper is of greater width than said element.

3. A grass cutting blade as set forth in claim 1 wherein the flexible element is spaced from the resilient bumper so that said element can flex rearwardly without engaging said bumper when cutting grass.

4. A grass cutting blade as set forth in claim 1 wherein the flexible cutting element is curved toward the resilient bumper and has its trailing edge in close proximity to the leading edge of said bumper.

5. A grass cutting blade as set forth in claim 1 wherein the flexible cutting element is made integral with the blade.

6. A grass cutting blade as set forth in claim 1 including means on the body for removably mounting the flexible cutting element thereon.

7. A grass cutting blade as set forth in claim 1 wherein the flexible cutting element has a roughened leading edge.

8. A grass cutting blade including an elongate body of flexible material, an elongate narrow whip of flexible material extending from each end of the body, an integral relatively wide bumper extending from each end of said body with its leading edge adjacent the trailing edge of each whip for engagement by the whip to limit rearward flexing thereof when said whip strikes an obstacle.

9. A grass cutting blade as set forth in claim 8 wherein each whip is spaced from the adjacent bumper so that said whip can flex rearwardly without engaging said bumper when cutting grass.

10. A grass cutting blade as set forth in claim 8 wherein each whip is curved rearwardly toward the adjacent bumper and has its trailing edge in close proximity to the leading edge of said bumper.

11. A grass cutting blade as set forth in claim 8 wherein each whip has a serrated leading edge.

12. A grass cutting blade as set forth in claim 8 wherein the whips are made integral with the blade.

13. A grass cutting blade as set forth in claim 8 wherein the whips extend radially of the axis of rotation of the blade.

14. A grass cutting blade as set forth in claim 8 wherein the blade has a socket in each end, the whips being removably mounted in the sockets.

References Cited in the file of this patent
UNITED STATES PATENTS
2,869,311    Beeston _____ Jan. 20, 1959